ð US010649764B2

United States Patent
Kulakovsky et al.

(10) Patent No.: US 10,649,764 B2
(45) Date of Patent: May 12, 2020

(54) MODULE MIRRORING DURING NON-DISRUPTIVE UPGRADE

(71) Applicant: EMC IP Holding Company LLC, Hopkinton, MA (US)

(72) Inventors: Alex Kulakovsky, Hertzeliya (IL); Liran Loya, Hod Hasharon (IL); Ahia Lieber, Hertzeliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 16/052,090

(22) Filed: Aug. 1, 2018

(65) Prior Publication Data
US 2020/0042312 A1 Feb. 6, 2020

(51) Int. Cl.
*G06F 8/656* (2018.01)
*G06F 3/06* (2006.01)
*G06F 9/54* (2006.01)
*G06F 9/52* (2006.01)

(52) U.S. Cl.
CPC .......... *G06F 8/656* (2018.02); *G06F 3/0604* (2013.01); *G06F 3/0659* (2013.01); *G06F 3/0683* (2013.01); *G06F 9/52* (2013.01); *G06F 9/544* (2013.01)

(58) Field of Classification Search
CPC ... G06F 8/65; G06F 8/60; G06F 8/656; G06F 3/0604; G06F 3/0659; G06F 3/0683; G06F 9/52; G06F 9/544
USPC .......................................... 717/122, 168–178
See application file for complete search history.

(56) References Cited

U.S. PATENT DOCUMENTS

| 6,031,842 | A | * | 2/2000 | Trevitt | H04L 49/103 370/375 |
|---|---|---|---|---|---|
| 6,467,011 | B2 | * | 10/2002 | Scardamalia | G06F 13/1663 710/305 |
| 6,668,260 | B2 | * | 12/2003 | Zoltan | G06F 11/2082 707/610 |
| 6,732,231 | B1 | * | 5/2004 | Don | G06F 11/006 711/114 |
| 7,149,787 | B1 | * | 12/2006 | Mutalik | G06F 16/221 709/217 |
| 9,176,902 | B1 | * | 11/2015 | Long | G06F 13/14 |
| 9,747,291 | B1 | * | 8/2017 | Mall | G06F 16/122 |
| 9,753,718 | B1 | * | 9/2017 | Carter | G06F 9/4406 |
| 2012/0110150 | A1 | * | 5/2012 | Kosuru | H04L 41/082 709/221 |
| 2015/0188989 | A1 | * | 7/2015 | Chaliparambil | H04L 67/10 709/204 |
| 2017/0031602 | A1 | * | 2/2017 | Xu | G06F 8/65 |
| 2017/0153885 | A1 | * | 6/2017 | Regan | H04L 67/34 |
| 2018/0027058 | A1 | * | 1/2018 | Balle | G05D 23/1921 709/226 |

(Continued)

*Primary Examiner* — Marina Lee
(74) *Attorney, Agent, or Firm* — Daly, Crowley Mofford & Durkee, LLP

(57) ABSTRACT

An aspect of module mirroring during an non-disruptive upgrade includes creating a mirrored set of management processes for a storage cluster that is subject to an upgrade a new software version, interconnecting components of the mirrored set and an original set of the management processes while the storage cluster is actively managed by an original set of management processes, and performing a handover between the management processes of the storage cluster.

17 Claims, 7 Drawing Sheets

(56) References Cited

U.S. PATENT DOCUMENTS

2018/0173573 A1* 6/2018 Navasivasakthivelsamy .............. H04L 9/32

* cited by examiner

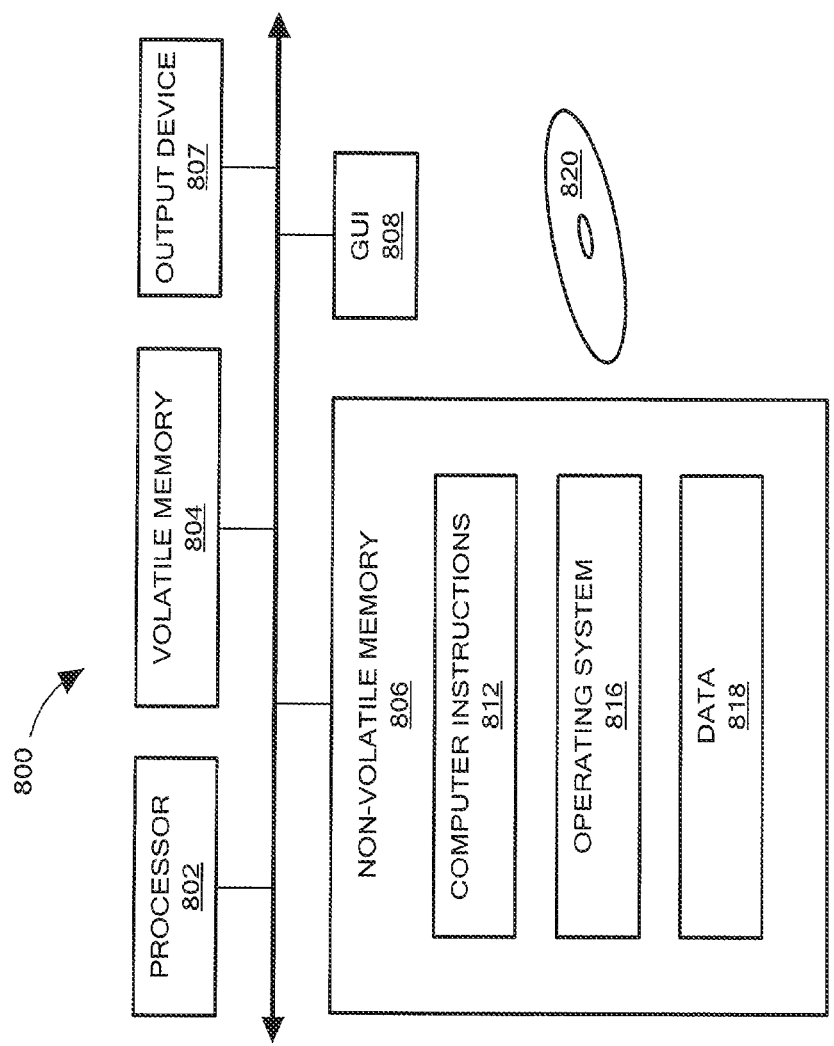

MODULE MIRRORING DURING NON-DISRUPTIVE UPGRADE

BACKGROUND

Modern storage systems, such as XtremIO, support non-disruptive upgrades (NDUs) to allow upgrading a software version without system downtime and without impacting system performance or a user's workload.

Storage systems like XtremIO are very complex and consist of multiple layers of management processes and a layer of datapath processes that intercommunicate and work in synergy in order to maintain high performance and high availability of the system.

During an upgrade all processes need to be restarted with a new software version code, reconfigured, and all connections need to be reestablished without causing hiccups from the host side.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for module mirroring during a non-disruptive upgrade. The method includes creating a mirrored set of management processes for a storage cluster that is subject to an upgrade a new software version, interconnecting components of the mirrored set and an original set of the management processes while the storage cluster is actively managed by an original set of management processes, and performing a handover between the management processes of the storage cluster.

Another aspect may provide a system for module mirroring during a non-disruptive upgrade. The system includes a memory having computer-executable instructions and a processor. The processor executes the computer-executable instructions. When executed by the processor, the computer-executable instructions cause the processor to perform operations. The operations include creating a mirrored set of management processes for a storage cluster that is subject to an upgrade a new software version, interconnecting components of the mirrored set and an original set of the management processes while the storage cluster is actively managed by an original set of management processes, and performing a handover between the management processes of the storage cluster.

Another aspect may provide a computer program product embodied on a non-transitory computer readable medium. The computer program product includes instructions that, when executed by a computer, causes the computer to perform operations. The operations include creating a mirrored set of management processes for a storage cluster that is subject to an upgrade a new software version, interconnecting components of the mirrored set and an original set of the management processes while the storage cluster is actively managed by an original set of management processes, and performing a handover between the management processes of the storage cluster.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 7 is a block diagram of an illustrative computer that can perform at least a portion of the processing described herein.

DETAILED DESCRIPTION

Figure 1:
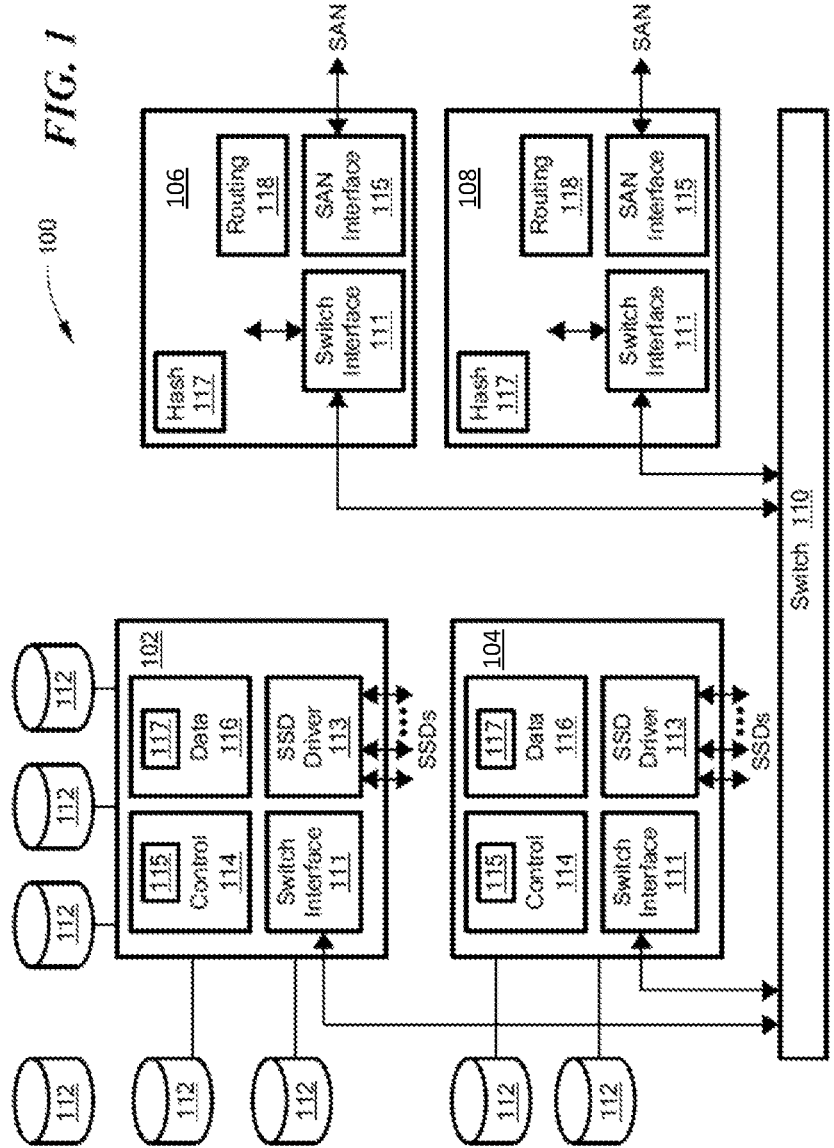
FIG. 1 is a block diagram of a content-based storage system.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drives (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout meta-data, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or Infiniband.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1 shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

As indicated above, modern storage systems like XtremIO support non-disruptive upgrades (NDUs) to allow upgrading of a software version without system downtime and without impacting system performance and a user's workload. Storage systems like XtremIO are very complex and consist of multiple layers of management processes and a layer of datapath processes that intercommunicate and work in synergy in order to maintain high performance and high availability of the system. During an upgrade, all processes need to be restarted with new a software version code, reconfigured, and all connections need to be reestablished without causing hiccups from the host side.

Most storage systems have multiple management processes with distributed responsibility that manage an entire cluster. In XtremIO, the cluster management consists of two main processes: a platform process (PM) and system manager process (SYM). PMs have an instance on every cluster node in the cluster and are responsible for monitoring all hardware components and managing node related flows (e.g., firmware upgrades, encryption, clustering etc).

Figure 2:
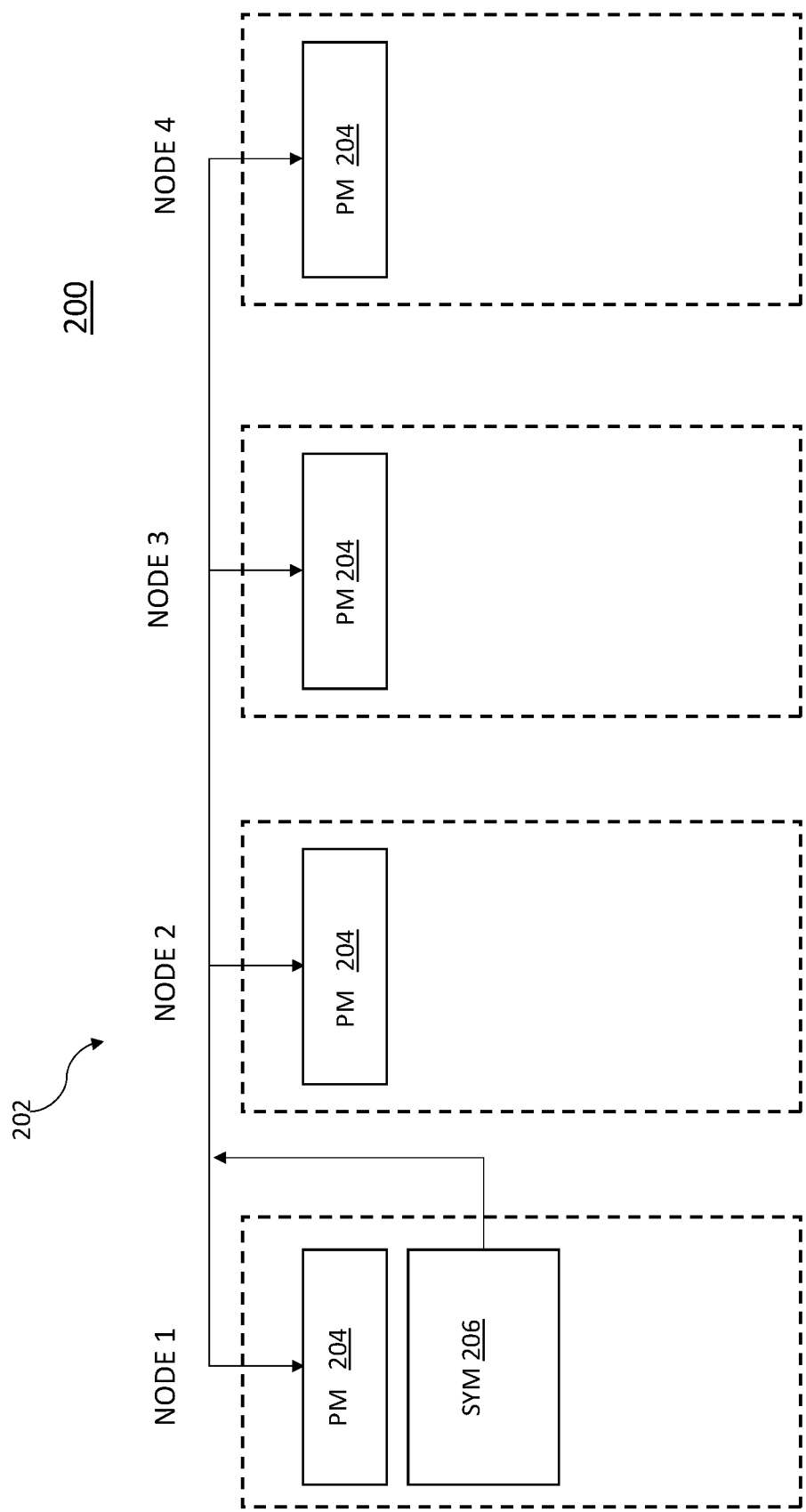
FIG. 2 is block diagram of a module layout and communication flow.

A SYM process is a cluster-wide singleton that aggregates cluster-wide information received from all modules and is responsible for managerial actions. A management connectivity overview SYM is connected to PMs via a management interface over InfiniBand. The communication is implemented in a server-client manner. For example, the SYM issues queries and the PM responds after performing a requested action. As shown in FIG. 2, a module layout 200 and communication flow are illustrated. In the module layout 200, a group of nodes 202 (nodes 1-4) each include a PM, and Node 1 includes a SYM 206.

An XtremIO cluster has three modules per cluster node that together implement XtremIO's data module, which handles every user input/output (IO), deciding where to route the request, where to handle the request, and to store the block of data.

As described above in FIG. 1, there are three datapath modules R, C, and D. The SYM maintains multiple connects to the R, C, and D modules via an InfiniBand interface using a different port for each connection.

During an NDU, all modules are killed and need to be respawned again with the new software version. While the modules are down host IOs are served and the cluster is considered to be in a state referred to as Data Unavailable (DU). Hosts can tolerate up to 30 seconds in DU state, after which a timeout expires, and the storage is declared as down. Thus, from the aforementioned behavior, all modules need to be restarted and reconnected within 30 seconds.

Two bottlenecks of this flow happen during restart of the modules and reconnection of the modules. In XtremIO all modules are interconnected and dependent on each other; therefore, the flow must be sequential which can slow down the process. During restart, the PMs are spawned on all nodes, the PMs vote and decide and the SYM should be spawned, the SYM is spawned, the SYM connects to the PMs, the SYM spawns the R, C, and D modules on all nodes, and the SYM connects to the R, C, and D modules.

In the connection flow, since an XtremIO cluster can reach up to 8 bricks (16 nodes), and the SYM opens several connections to 4-5 modules on each node, this process can take time and increase the DU time. The connection process can be divided into two phases: SYM connects to all PMs, and the SYM connects to all R, C, D modules after restarting them.

In the embodiments described herein, a technique is provided for respawning management processes with close to zero downtime. The embodiments spawn new PMs and SYM modules while the system is fully active and interconnects new SYM and PM modules while being fully active.

Instead of killing all processes and starting them over with a new version, a "mirrored set" of all management processes (PMs and SYM) of a new software version is created, and the mirrored set is interconnected while the cluster is still managed by the original set of management processes. A swift "handover" between the management systems is then performed.

Figure 3:
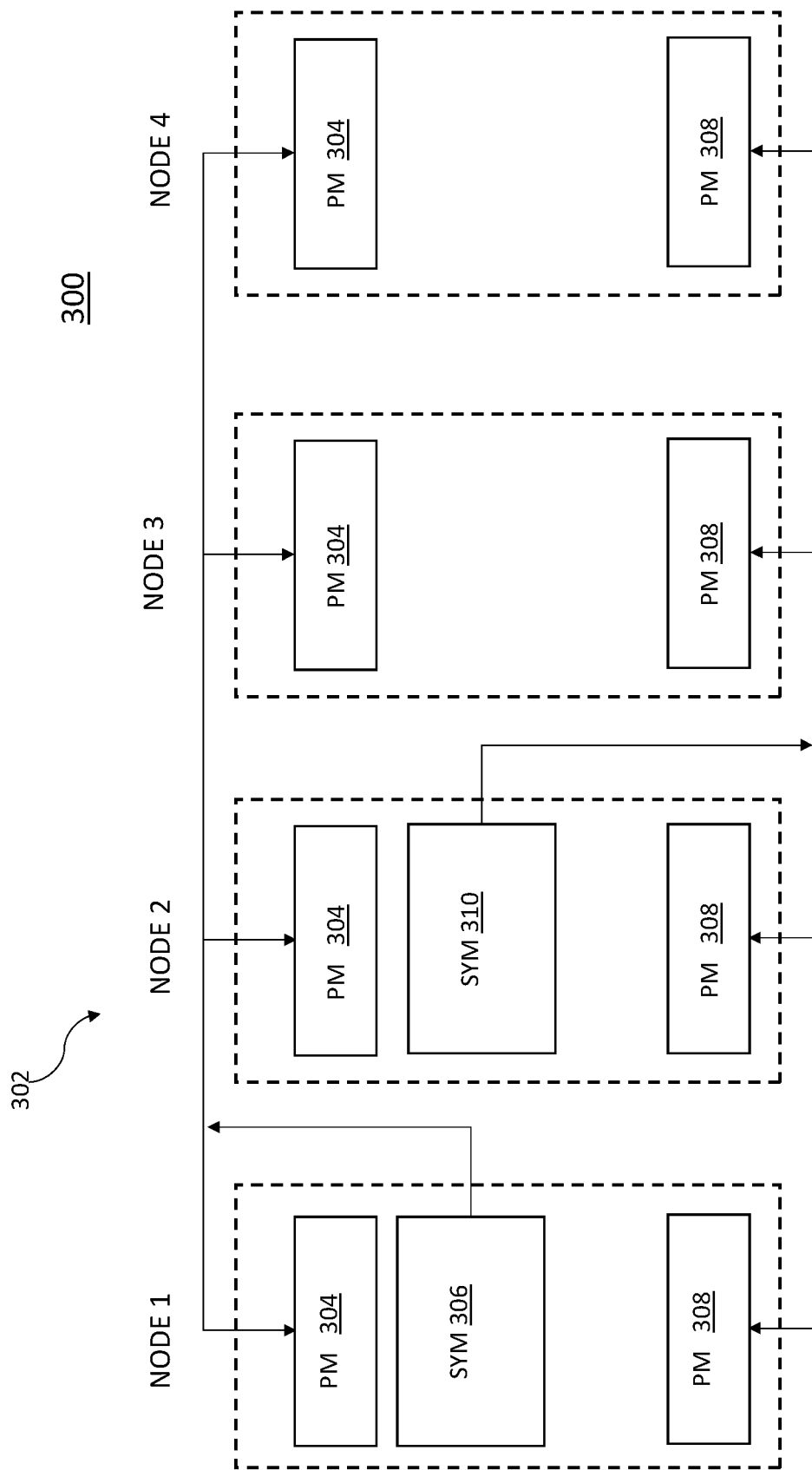
FIG. 3 is a block diagram of a process/module layout while "module mirroring" is executed.

As shown in FIG. 3 a process/module layout 300 is shown in which "module mirroring" is executed. As shown in FIG. 3, four nodes 302 (nodes 1-4) include an original set of management processes that includes PMs 304 and SYM 306. A mirrored set of the management processes include PMs 308 and SYM 310. In the mirrored set, node that the SYM 310 resides on Node 2 while the original SYM 306 resides on Node 1. This is due to lack of memory on a SYM node to run another SYM process.

Since XtremIO modules are connected via the same InfiniBand interface, this poses a risk of interfering messaging. To solve this, new modules need to work in a different InfiniBand "subnet." Since new PMs will start polling all the hardware and the new SYM will start running high availability (HA) logic, there is a risk of split brain decisions. In order to solve this, new modules need to be brought up in a degraded mode, disabling most of services that can interfere with cluster-wide behavior but yet provide enough information and flexibility to proceed with the flow and make it fast.

The managing SYM that runs the upgrade flow needs to be able to send requests to the new module (SYM to SYM communication) in order to manage the flow. In order to do that, communication to the new SYM and PM modules is needed. As indicated above, communication is split to different subnets.

Figure 4:
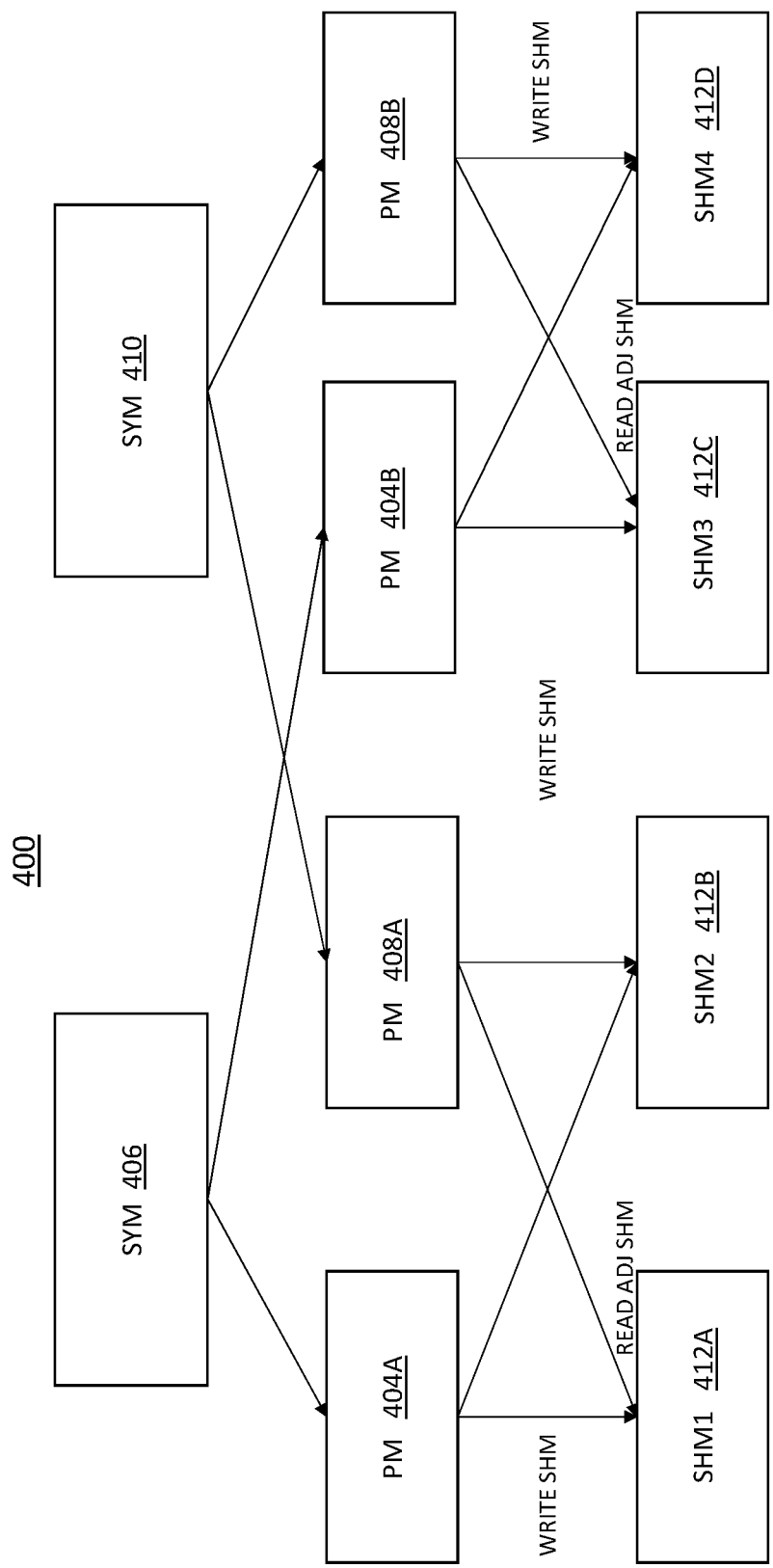
FIG. 4 is a block diagram of a shared memory interface for SYM to SYM communication.

The embodiments described herein provide a defined shared memory interface between new and old PMs, which allows processes of different versions that run on different nodes to exchange messages in addition to making sure they can handle messages that were added in the newer version of software and aren't fully supported in the old one. FIG. 4 illustrates a shared memory interface configuration 400 for the mirrored management processes. In FIG. 4, the original set of management processes are shown as SYM 406 and PMs 404A and 404B. The new set is shown as SYM 410 and PMs 408A and 408B. The shared memory interfaces are shown as interfaces 412A-412D.

Figure 5:
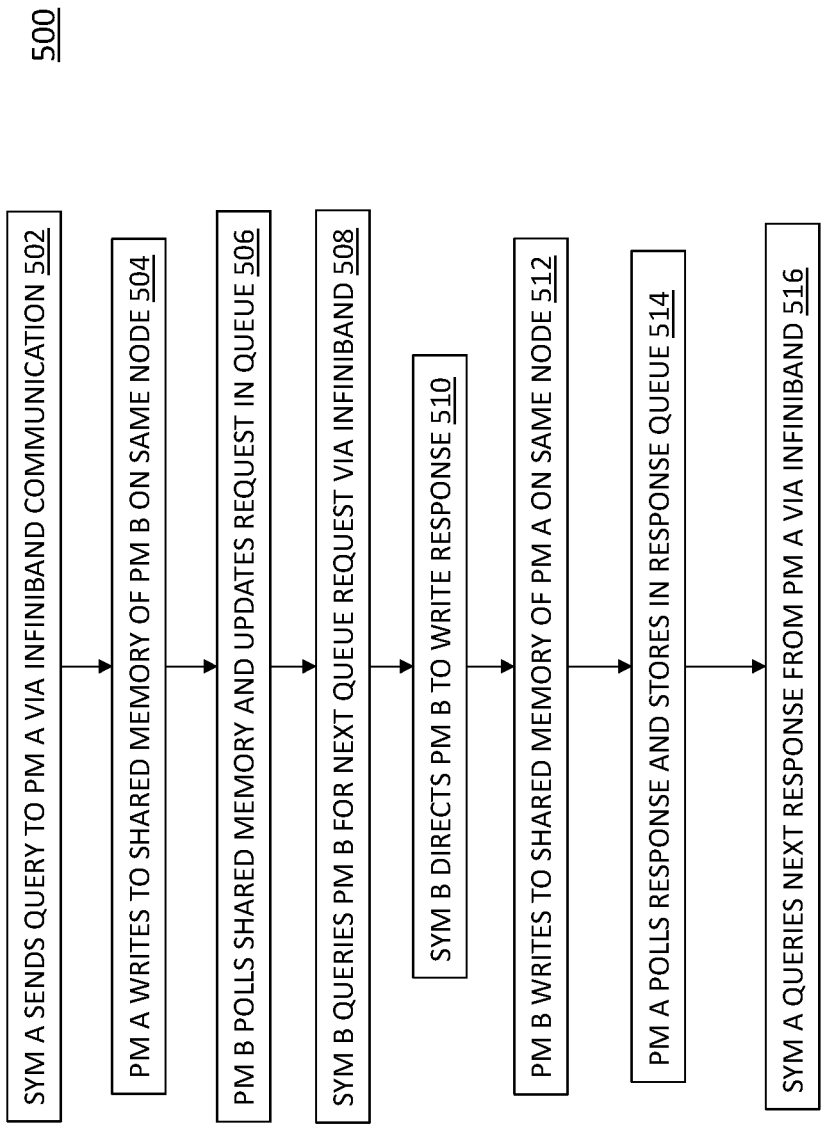
FIG. 5 is a flow diagram of a process for performing SYM to SYM communication during a non-disruptive system upgrade.

The communication flow between management SYM A 406 and management SYM 410 with respect to the configuration shown in FIG. 4 will now be described in the flow diagram 500 of FIG. 5. In block 502, SYM 406 sends a query to a PM via InfiniBand communication. In block 504, the PM writes to the shared memory of the PM on the same node. In block 506, the PM polls the shared memory and updates the request in a queue. In block 508, the SYM 410 queries PM for the next queue request via InfiniBand. In block 510, the SYM 410 handles the request and asks the PM to write the response. In block 512, the PM writes to the shared memory on the same node. In block 514, the PM polls the response and stores it in response queue. In block 516, the SYM 406 queries next response from the PM via InfiniBand.

The duplicate set of modules have basically the same functionality and flows as the original (i.e., once spawned the modules attempt to access all system resources (etc., file system, hardware devices, SSDs, memory, system services, etc.), which in most cases if not handled properly, can cause timeouts and performance issues. The embodiments described herein eliminates this challenge by spawning new modules in a special "degraded" mode that on one side avoids excessive access to system resources and on the other allows a swift handover of management responsibility to new modules when the upgrade is over. In order to achieve this two solutions are presented. The first solution is a partially degraded launch in which services that can't have another instance created are disabled to avoid split brain and congestions. Modules are configured to define and disable these on launch. The second solution is reduced frequency launch in which services that can run but might abuse resource use are run with lower frequency than original modules in order to minimize the impact. This allows new modules to be up to date with the latest system information while not influencing the overall system behavior.

Once the new modules are ready to receive managerial responsibility over the cluster, they need to notify the managing SYM to start closing all the needed processes. This may be implemented by shared memory communication as described herein. When the new SYM gains responsibility over the cluster it needs to make sure that the "degraded" mode is exited and all the services start running in regular mode. The reduced frequency part launch ensures that most modules contain latest system data; therefore, no time is wasted on syncing at this point.

Due to the complexity of upgrade flow and the multiplicity of processes, a complex rollback engine may be implemented for handling to be written to handle all the cases and ensuring that the cluster is rolled back to the original state without leaving unclosed ends.

Since many resources are shifted during the upgrade and various new communication ports are used in order to allow two sets of "mirrored modules" to run simultaneously, in order to be able to run additional upgrades in the future, a process is employed to bring the system to exactly same state it was in prior to the upgrade. This process is handled by a dedicated thread, post upgrade when the cluster is fully functional. Another set of connections is opened via original ports and once it is over, other ports are closed and the rest of resources are freed.

Figure 6:
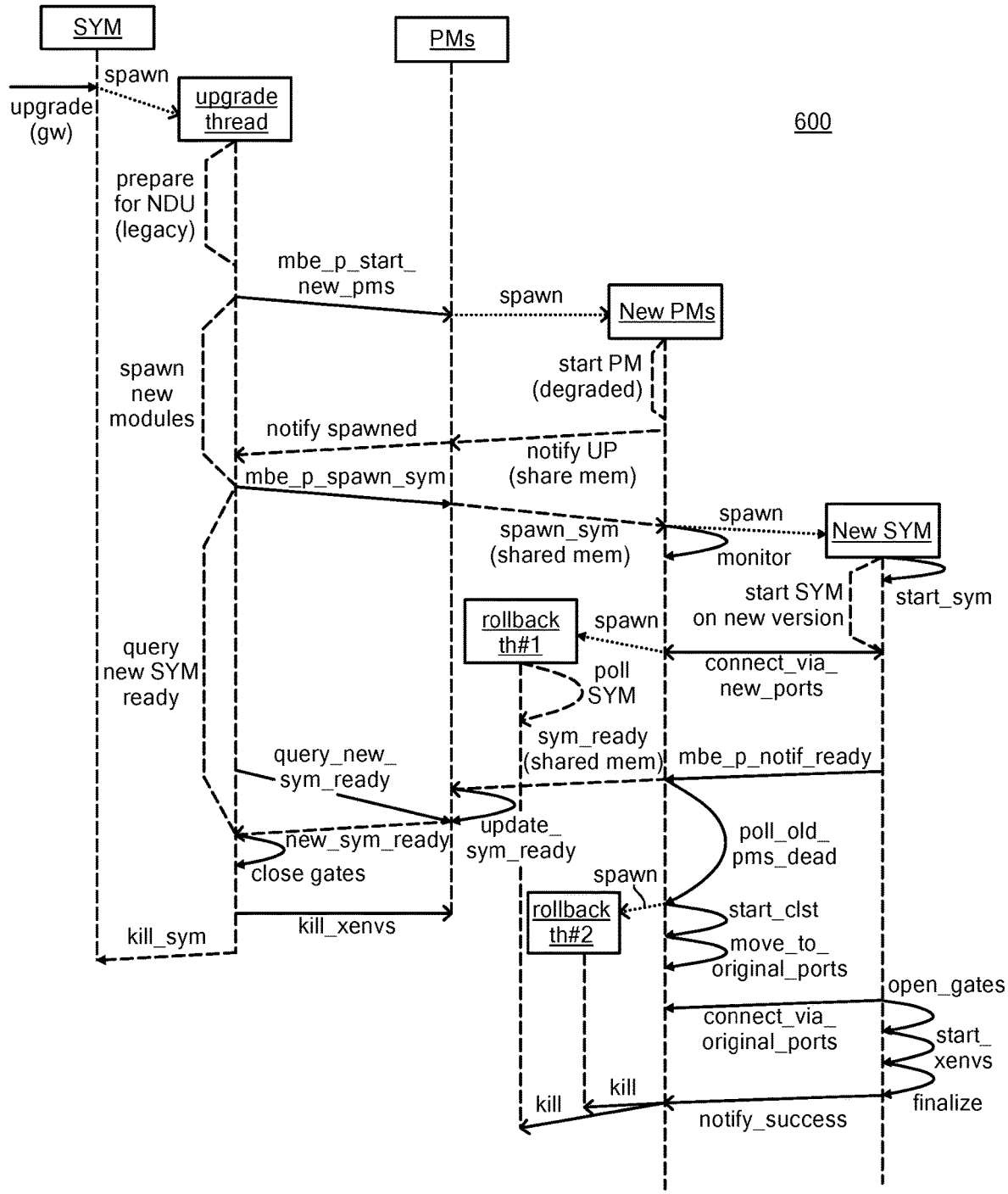
FIG. 6 is a flow diagram of a process for respawning management processes for a storage cluster.

FIG. 6 illustrates a process 600 for respawning management processes for a storage cluster will now be described. The process 600 describes the communication flow among the original SYM and PMs and the new SYM and PMs.

FIG. 7 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method, comprising:
creating a mirrored set of management processes for a storage cluster that is subject to an upgrade a new software version;
interconnecting components of the mirrored set and an original set of the management processes while the storage cluster is actively managed by the original set of management processes, the interconnecting including providing a shared memory interface between the original set of management processes and the mirrored set of management processes, wherein the components of the mirrored set communicate through a subnet of a network of the storage cluster that is different than a subnet of the network through which components of the original set of management processes communicate; and
upon completion of the upgrade, performing a handover between the management processes of the storage cluster.

2. The method of claim 1, wherein the management processes include at least one platform module (PM) operating on a node in the storage cluster, the PM configured to monitor hardware components and managing node related flows.

3. The method of claim 2, wherein the management processes include a system manager module (SYM) configured to aggregate cluster-wide information received from PMs and perform managerial functions for the storage cluster.

4. The method of claim 1, wherein the mirrored set of management processes are created and interconnected while the storage cluster is operating in a degraded mode.

5. The method of claim 4, wherein the degraded mode comprises a partially degraded launch where selected services are disabled.

6. The method of claim 4, wherein the degraded mode further comprises a reduced frequency launch where select services are run with reduced frequency.

7. A system, comprising:
a memory comprising computer-executable instructions; and
a processor executing the computer-executable instructions, the computer-executable instructions when executed by the processor cause the processor to perform operations comprising:
creating a mirrored set of management processes for a storage cluster that is subject to an upgrade a new software version;
interconnecting components of the mirrored set and an original set of the management processes while the storage cluster is actively managed by the original set of management processes, the interconnecting including providing a shared memory interface between the original set of management processes and the mirrored set of management processes, wherein the components of the mirrored set communicate through a subnet of a network of the storage cluster that is different than a subnet of the network through which components of the original set of management processes communicate; and
upon completion of the upgrade, performing a handover between the management processes of the storage cluster.

8. The system of claim 7, wherein the management processes include at least one platform module (PM) operating on a node in the storage cluster, the PM configured to monitor hardware components and managing node related flows.

9. The system of claim 8, wherein the management processes include a system manager module (SYM) configured to aggregate cluster-wide information received from PMs and perform managerial functions for the storage cluster.

10. The system of claim 8, wherein the mirrored set of management processes are created and interconnected while the storage cluster is operating in a degraded mode.

11. The system of claim 10, wherein the degraded mode comprises a partially degraded launch where selected services are disabled.

12. The system of claim 11, wherein the degraded mode further comprises a reduced frequency launch where select services are run with reduced frequency.

13. A computer program product embodied on a non-transitory computer readable medium, the computer program product including instructions that, when executed by a computer causes the computer to perform operations comprising:

creating a mirrored set of management processes for a storage cluster that is subject to an upgrade a new software version;

interconnecting components of the mirrored set and an original set of the management processes while the storage cluster is actively managed by the original set of management processes, the interconnecting including providing a shared memory interface between the original set of management processes and the mirrored set of management processes, wherein the components of the mirrored set communicate through a subnet of a network of the storage cluster that is different than a subnet of the network through a which components of the original set of management processes communicate; and upon completion of the upgrade, performing a handover between the management processes of the storage cluster.

14. The computer program product of claim 13, wherein the management processes include at least one platform module (PM) operating on a node in the storage cluster, the PM configured to monitor hardware components and managing node related flows.

15. The computer program product of claim 14, wherein the management processes include a system manager module (SYM) configured to aggregate cluster-wide information received from PMs and perform managerial functions for the storage cluster.

16. The computer program product of claim 13, wherein the mirrored set of management processes are created and interconnected while the storage cluster is operating in a degraded mode.

17. The computer program product of claim 16, wherein the degraded mode comprises one of a partially degraded launch where selected services are disabled and a reduced frequency launch where select services are run with reduced frequency.

* * * * *